United States Patent [19]

Montoya et al.

[11] Patent Number: 4,874,839
[45] Date of Patent: Oct. 17, 1989

[54] STABILIZATION OF POLY(ARYLENE ETHER KETONES)

[75] Inventors: Wayne Montoya, Newark; Robert H. Reamey, Menlo Park, both of Calif.

[73] Assignee: Raychem Corporation, Menlo Park, Calif.

[21] Appl. No.: 229,082

[22] Filed: Aug. 5, 1988

[51] Int. Cl.$^4$ ............................................. C08F 6/00
[52] U.S. Cl. ................................. 528/480; 528/125; 528/128; 528/481; 528/499; 528/503
[58] Field of Search ............... 528/480, 125, 128, 481, 528/499, 503

[56] References Cited

U.S. PATENT DOCUMENTS

| | | | |
|---|---|---|---|
| 3,065,205 | 11/1962 | Bonner | 528/180 |
| 3,441,538 | 4/1969 | Marks | 528/86 |
| 3,637,592 | 1/1972 | Berr | 528/194 |
| 3,751,398 | 8/1973 | Dahl | 528/501 |
| 3,767,620 | 10/1973 | Angelo et al. | 415/36 |
| 3,953,400 | 4/1976 | Dahl | 528/179 |
| 3,956,240 | 5/1976 | Dahl et al. | 528/125 |
| 4,320,224 | 3/1982 | Rose et al. | 528/125 |
| 4,361,693 | 11/1982 | Jansons | 528/86 |
| 4,611,033 | 9/1986 | Maresca | 525/419 |
| 4,709,007 | 11/1987 | Jansons et al. | 528/222 |

FOREIGN PATENT DOCUMENTS 971227  9/1964  United Kingdom .

OTHER PUBLICATIONS

Attwood et al, Polymer 22, 1096 (1981).

Primary Examiner—John Kight
Assistant Examiner—M. L. Moore
Attorney, Agent, or Firm—Yuan Chao; Edith A. Rice; Herbert G. Burkhard

[57] ABSTRACT

A method of stabilizing a poly(arylene ether ketone), which method comprises in one embodiment heating the poly(arylene ether ketone) at a temperature between about 240° C. and about 325° C. for a period of between about 0.5 and about 24 hours, prior to any melt-processing of the poly(arylene ether ketone) and in another embodiment hydrothermally treating the poly(arylene ether ketone) by heating it to a temperature of at least 160° C. while contacting it with water.

12 Claims, No Drawings

STABILIZATION OF POLY(ARYLENE ETHER KETONES)

BACKGROUND OF THE INVENTION

This invention relates to a method of stabilizing poly(arylene ether ketones).

Poly(arylene ether ketones) (PAEK's), in particular para-linked ones, possess many desirable properties, for example, high temperature stability, mechanical strength, and resistance towards common solvents. Two types of PAEK synthesis are known in the art, commonly referred to as electrophilic and nucleophilic synthesis, respectively.

In an electrophilic synthesis, the polymerization step leads to formation of an aryl ketone group, derived from reaction the between an aromatic acid halide (or similarly reactive acyl derivative) and an activated hydrogen atom attached to an aromatic carbon atom, i.e., a hydrogen displaceable under the electrophilic reaction conditions. The monomer system can be (a) phosgene or an aromatic diacid dihalide such as terephthaloyl chloride and a polynuclear aromatic compound containing two activated hydrogen atoms such as 1,4-diphenoxybenzene or (b) a polynuclear aromatic compound containing both an acid halide group and an activated hydrogen atom, such as p-phenoxybenzoyl chloride.

An electrophilic synthesis is sometimes also referred to as a Friedel-Crafts synthesis or polymerization. Typically, it is carried out in a reaction medium comprising the monomer(s), a catalyst such as anhydrous aluminum trichloride, and an inert solvent such as methylene chloride. Because the carbonyl groups of the monomer(s) or other reactant(s) complex with aluminum trichloride and thereby deactivate it, the aluminum trichloride catalyst is generally employed in an amount slightly more than one equivalent for each equivalent of carbonyl groups in the reaction medium. Other metal halides such as ferric chloride can also be employed as the catalyst. The preparation of PAEK'S by Friedel-Crafts polymerization with aluminum chloride as catalyst is disclosed by Bonner, in U.S. Pat. No. 3,065,205 (1962); Goodman, in GB No. 971,227 (1964); and Jansons et al., in U.S. Pat. No. 4,709,007 (1987). Friedel-Crafts polymerization may also be effected in anhydrous hydrogen fluoride-boron trifluoride. See, e.g., Marks, in U.S. Pat. Nos. 3,441,538 (1969); Dahl, 3,953,400 (1976); and Dahl et al, in 3,956,240 (1976).

In a nucleophilic synthesis, the polymerization step leads to the formation of an aryl ether group, derived from the reaction of a phenoxide group with an aryl halide group in which the halide is activated towards nucleophilic displacement. The phenoxide containing monomer may be a bisphenol such as hydroquinone, while the halide containing monomer may be a dihalide such as 4,4,-difluorobenzophenone. Exemplary nucleophilic syntheses are disclosed in Rose et al., U.S. Pat. No. 4,320,224 (1982), and in Attwood et al., Polymer 22, 1096 (1981).

The tendency of their carbonyl groups to form complexes and their crystallinity and insolubility in most solvents make it difficult to isolate PAEK's from the polymerization mixture without their containing catalyst residues and other impurities. Further, such impurities are difficult to remove from the isolated polymer. These impurities are undesirable, because they may adversely affect polymer stability during later use. As part of the regular work-up technique, PAEK's have commonly been dried in vacuo, typically at a temperature between 100° and 160° C., although temperatures up to 220° C. have been used. See, e.g., Marks, Dahl '400, and Dahl '240, cited supra, and Berr, U. S. 3,637,592 (1972).

Special techniques have been proposed for the isolation or post-isolation treatment of PAEK's to improve their properties. Dahl, in U.S. Pat. No. 3,751,398 (1973), discloses a spray drying process in which sulfur dioxide, preferably 90–99% by volume, is admixed into a hydrogen fluoride-boron trifluoride polymerization medium and the mixture is atomized. Maresca, in U.S. Pat. No. 4,611,033 (1986), discloses a stabilization process in which the polymer is treated with a dicarbonyl chelating agent such as pentanedione. Angelo et al., in U.S. Pat. No. 3,767,620 (1973), disclose that certain PAEK's may have xanthydrol end-groups and that the thermal stability of such PAEK's can be improved by reducing the xanthydrol groups to xanthene groups with reductants such as formic acid or triethylsilane. These techniques share a common disadvantage in that they may require the addition of a chemical agent whose own removal from the polymer could be problematic.

We have invented a novel treatment for PAEK's which significantly reduces the impurity levels therein and improves their properties such as melt stability and/or melt viscosity.

SUMMARY OF THE INVENTION

Our invention provides a method of stabilizing a poly(arylene ether ketone). In one embodiment, the method comprises heating the poly(arylene ether ketone) at a temperature between about 240° C. and about 325° C. for a period of between about 0.5 and about 24 hours, prior to any melt-processing of the poly(arylene ether ketone). In another embodiment, the method comprises hydrothermally treating the poly(arylene ether ketone) by heating it to a temperature of at least 160° C. while contacting it with water.

DESCRIPTION OF PREFERRED EMBODIMENTS

We have discovered that the stability of a PAEK, in particular its stability under melt processing conditions, can be substantially improved by a high temperature treatment during the work up or isolation process. Among the benefits achievable through our invention are lowered levels of impurities such as chloride and/or aluminum in the final polymer, lighter color extrudates upon melt-processing, reduced melt viscosity, and/or improved melt stability.

In a first aspect of our invention, the high temperature treatment comprises a hydrothermal treatment, by which is meant heating the PAEK to a temperature of at least 160° C. while contacting it with water. However, the maximum temperature should not be too high, for then there may be some degradation of the PAEK. Thus, the maximum temperature is preferably below about 325° C., and more preferably below about 310° C. The temperature is preferably between about 210° and about 300° C., more preferably between about 240° and about 300° C. The heating time is preferably between about 0.25 and about 5 hr, more preferably between about 0.5 and about 3 hr. The minimum heating time for effective treatment may be readily determined empirically. Overlong heating, particularly at temperatures about or above 325° C., may result in damage to the polymer.

In one preferred hydrothermal treatment, the PAEK is heated in a pressurized vessel, with the PAEK at least partially, and preferably completely, immersed in an aqueous medium which preferably consists essentially of water. It is to be understood that the presence in the aqueous medium of some additional materials, such as small amounts of hydrochloric acid and aluminum salts from the hydrolysis of aluminum chloride catalyst residues, may be unavoidable. But the addition thereto of significant amounts of additional substances which have deleterious effects on the quality of the PAEK should of course by avoided. The amount of aqueous medium is preferably at least 15 parts, more preferably at least 30 parts, per part of polymer.

Suitable pressurized vessels are, for example, a Parr bomb or an autoclave. The pressure buildup varies with temperature, for example approximately 90 psi at 160° C. and approximately 1245 psi at 300° C., and may be readily estimated by reference to water vapor pressure tables, such as found in the Handbook of Chemistry and Physics, 6th Ed. (1986-1987), pp. D190-191 (CRC Press). If a PAEK is made by a Friedel-Crafts polymerization, the impurities therein are likely to be of an acidic nature (e.g., aluminum chloride residue) and the pH of the aqueous medium may therefore drop during the hydrothermal treatment. Then, the vessel should be made of an acid corrosion resistant material, such as titanium. Glass lined pressure vessels may also be used, if the time-temperature combinations involved do not exceed those for which such vessels are rated.

In another embodiment, the hydrothermal treatment is performed by charging superheated steam into a chamber in which the PAEK is contained.

In a second aspect of our invention, the high temperature treatment is performed "dry," that is, without simultaneously contacting the PAEK with water. The PAEK is heated to a temperature between about 240° and about 325° C., preferably between about 275° and about 310° C., before any melt processing thereof. Generally, this is done under an air or nitrogen atmosphere, although a vacuum may also be used, as may an atmosphere of an inert gas such as argon. The heating time is preferably between about 0.5 and about 24 hr, more preferably between about 2 and about 17 hr.

Our invention is particularly efficacious in reducing polymer melt viscosity, increasing melt stability, and lightening the color of polymer extrudate. Residual levels of chloride and aluminum may also be lowered, particularly with the hydrothermal treatment.

The various heat treatments may be combined, for example a hydrothermal treatment may be followed by a "dry" heating, or vice versa.

PAEK's which may advantageously be treated according to our invention include those having the following repeat units, or copolymers having combinations of these repeat units:

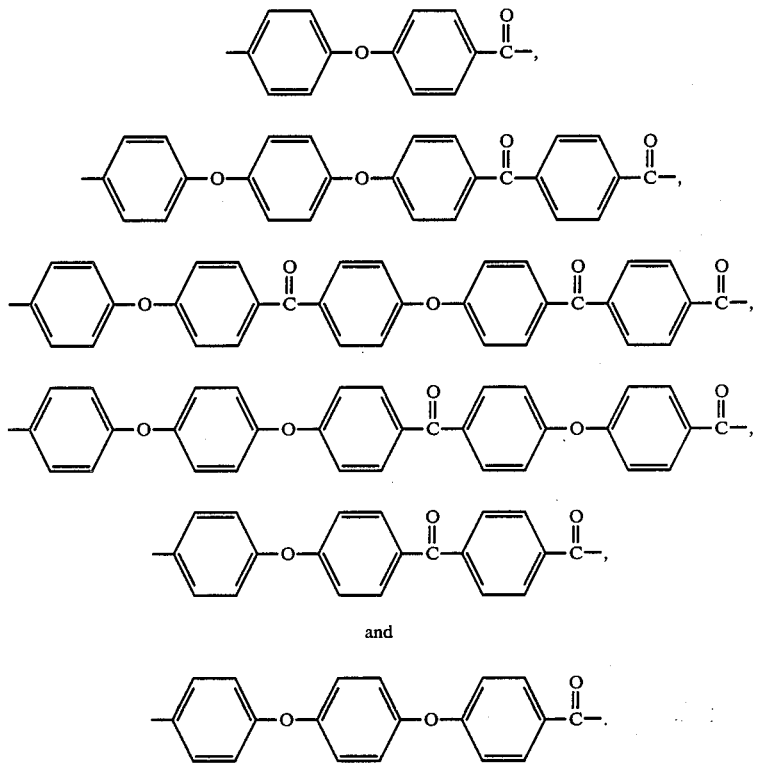

and

PAEK's such as the above ones may be prepared by polymerizing, in the presence of a Lewis acid catalyst, a monomer system comprising
(a) (i) phosgene or an aromatic dicarboxylic acid dihalide and (ii) a substantially stoichiometric amount of a polynuclear aromatic comonomer having two active hydrogen atoms or
(b) a polynuclear aromatic carboxylic acid halide having an active hydrogen atom.

Suitable aromatic dicarboxylic acid dihalides include: terephthaloyl chloride, isophthaloyl chloride, [1,1'-biphenyl]-4,4'-dicarbonyl dichloride, naphthalene-1,4-dicarbonyl dichloride, naphthalene-2,6-dicarbonyl dichloride, naphthalene-3,6-dicarbonyl dichloride, benzophenone-4,4'-dicarbonyl dichloride, and diphenyl ether-4,4'-dicarbonyl dichloride. Terephthaloyl chloride, isophthaloyl chloride, [1,1'-biphenyl]-4,4'-dicarbonyl dichloride, and diphenyl ether-4,4'-dicarbonyl dichloride are preferred.

Suitable polynuclear aromatic comonomers having two active hydrogen atoms include: diphenyl ether, 1,4-diphenoxybenzene, 4-phenoxybiphenyl 4,4'-diphenoxybiphenyl, 4,4'-diphenoxybenzophenone, 4,4'-diphenoxydiphenylsulfone, 1,3-bis(4-phenoxybenzoyl)benzene, and 1,4-bis(4-phenoxybenzoyl)benzene. Diphenyl ether, 1,4-diphenoxybenzene, 4,4'-diphenoxybenzophenone, 1,3-bis(4-phenoxybenzoyl)benzene, and 1,4-bis(4-phenoxybenzoyl)benzene are preferred.

Suitable polynuclear aromatic carboxylic acid halides having an active hydrogen atom include: p-phenoxybenzoyl chloride, 4-biphenyloxybenzoyl chloride, 4'-phenoxybiphenyl-4-carbonyl chloride, and 4'-phenoxybenzophenone-4-carbonyl chloride. p-Phenoxybenzoyl chloride is preferred.

The PAEK may, in addition to arylene, ether and ketone groups, contain other functionalities introduced through appropriate comonomers. For example, sulfone groups may be introduced by using 4,4'-diphenoxydiphenyl sulfone as a comonomer. PAEK's further comprising imide, amide, ester, azo, quinoxaline, benzimidazole, benzoxazole, or benzothiazole groups may similarly be prepared by using monomers having such groups. See Dahl et al., EP 178,185 (1986).

Suitable Lewis acids include aluminum trichloride, aluminum tribromide, antimony pentachloride, antimony pentafluoride, indium trichloride, gallium trichloride, boron trichloride, boron trifluoride, zinc chloride, ferric chloride, stannic chloride, titanium tetrachloride, and molybdenum pentachloride. A preferred Lewis acid is aluminum trichloride.

A preferred Friedel-Crafts process for making PAEK's is described by Jansons et al. in U.S. Pat. No. 4,709,007 (1987), the disclosure of which is incorporated herein by reference. This application discloses a method of moderating or controlling Friedel-Crafts polymerizations by the addition of a Lewis base which acts as a controlling agent or by using specified excesses of the Lewis acid.

Preferred Lewis bases include diphenyl sulfone, dimethyl sulfone, N-methylformamide, N,N-dimethylformamide, N,N-dimethylacetamide, 1-methyl-2-pyrrolidone, tetramethylene sulfone (also known as sulfolane), n-butyronitrile, dimethyl sulfide, imidazole, acetone, benzophenone, trimethylamine, trimethylamine hydrochloride, tetramethylammonium chloride, pyridine-N-oxide, 1-ethylpyridinium chloride, lithium chloride, lithium bromide, sodium chloride, potassium chloride, potassium bromide, and mixtures thereof Particularly preferred Lewis bases are lithium chloride, N,N-dimethylformamide, dimethyl sulfone, and sulfolane.

Additionally, protic controlling agents, e.g. water, n-alkanols, or benzoic acid, may be used, as described in copending application of Towle, Ser. No. 07/096,415, filed Sept. 11, 1987, Non U.S. Pat. No. 4,841,013 the disclosure of which is incorporated herein by reference.

The molecular weight of the PAEK, the degree of branching, and amount of gelation may be controlled by the use of, for example, capping agents as described in Dahl, U.S. Pat. No. 4,247,682 (1981), the disclosure of which is incorporated herein by reference. The capping agent may be an electrophilic one, for example, benzoyl chloride, or a nucleophilic one, for example 4-phenoxybenzophenone, or combinations thereof.

In the preparation of PAEK's by a Friedel-Crafts polymerization, a Lewis acid is employed. As a result, the polymer contains Lewis acid complexed to the carbonyl groups of the polymer. For many polymerizations, the Lewis acid is complexed to substantially all the carbonyl groups in the polymer. As is well known with polymers of this type, the catalyst residue must be removed, i.e., the Lewis acid must be decomplexed from the polymer and removed. A method for removing the catalyst residue is described by Dahl in U.S. U.S. Pat. No. 4,237,884, the disclosure of which is incorporated herein by reference.

Decomplexation may be accomplished by treating the polymerization reaction mixture with a decomplexing base after completion of polymerization. The base can be added to the reaction medium or the reaction medium can be added to the base. The decomplexing base must be at least as basic towards the Lewis acid as the basic groups on the polymer chain. Such decomplexation should be effected before the isolation of the polymer from the reaction mixture and heat treatment according to the instant invention.

The amount of decomplexing base used should be in excess of the total amount of bound (complexed) and unbound Lewis acid present in the reaction mixture and is preferably twice the total amount of Lewis acid. Typical decomplexing bases which can be used include water, dilute aqueous hydrochloric acid, methanol, ethanol, acetone, N,N-dimethyl-formamide, N,N-dimethylacetamide, pyridine, dimethyl ether, diethyl ether, tetrahydrofuran, trimethylamine, trimethylamine hydrochloride, dimethyl sulfide, tetramethylene sulfone, benzophenone, tetramethylammonium chloride, isopropanol, and the like. The decomplexed polymer can then be recovered by conventional techniques such as separating the polymer by filtration; adding a nonsolvent for the polymer which is a solvent for or miscible with the Lewis acid/Lewis base complex and the Lewis acid; spraying the reaction medium into a nonsolvent for the polymer; or evaporating the volatiles from the reaction medium and then washing with an appropriate solvent to remove any remaining base/catalyst complex and diluent from the polymer.

Then, the PAEK may be digested with, for example, dilute aqueous hydrochloric acid or ammonia, to remove the bulk of catalyst and/or solvent residues A preferred digestion medium is water.

In the recovery of the polymer from the reaction mixture, the reaction mixture may be liquefied, if desired, by the method described by Reamey in U.S. Pat. No. 4,665,151 (1987), the disclosure of which is incorporated herein by reference.

Throughout this application, inherent viscosity refers to the mean inherent viscosity determined according to the method of Sorenson et al., "Preparative Methods of Polymer Chemistry,"2nd ed., (Interscience 1968), at page 44 (0.1 g polymer dissolved in 100 mL of concentrated sulfuric acid at 25° C.). Preferably, a PAEK has a high molecular weight, by which is meant a PAEK having an inherent viscosity greater than about 0.6 dL/g.

Polymer melt stability was estimated by measuring the melt viscosity at 20/sec rheometrially as a function of time. Pellets of PAEK, prepared by compaction, extrusion through a ⅜ inch extruder, and pelletization, were held for 5 and 30 min. in the barrel of a Sieglaff- McKelvey capillary rheometer at a temperature of 400° C. and then extruded therefrom. The melt viscosities at the end of each holding period were measured and compared. A significant change (rise) in the melt viscosity of the 30 minute sample compared to the 5 minute sample was taken to indicate melt instability. For some samples, melt viscosities were also measured after longer holding periods. The colors of extrudate samples was also noted, with a lighter color taken to indicate less degradation.

Aluminum residue analysis was performed by the following procedure: PAEK was dissolved in fuming nitric acid. The PAEK was then precipitated by diluting the acid, leaving an aqueous solution of aluminum salts The mixture was then filtered to remove the PAEK. The filtrate was analyzed for aluminum using atomic absorption spectroscopy.

The procedure for chloride residue analysis was as follows: PAEK was ignited in a compressed oxygen atmosphere in a closed vessel (bomb). After combustion, water soluble chloride was collected by washing the bomb and analyzed by ion chromatography.

A more complete understanding of our invention can be obtained by reference to the following examples, which are provided for purposes of illustration and not of limitation.

EXAMPLE 1

A polymerization reaction was performed using 4,4'-diphenoxybenzophenone (DPBP) and terephthaloyl chloride (TCl) as monomers, benzoyl chloride as capping agent, methylene chloride as solvent, aluminum chloride as catalyst, in the presence of dimethylsulfone Lewis base, according to the general method of Jansons et al., U.S. Pat. No.4,709,007. The TCl/dimethylsulfone/aluminum chloride molar ratio was 1/1.5/5.4 and the loading was 16 wt. % polymer solids. The reactants were mixed in a stirred vessel at below $-15°$ C. with the DPBP as the last added component. The reaction is allowed to warm to room temperature during which time the slurry of reactants became homogeneous. Within about 30 min. the reaction set into a gel.

The reaction was allowed to proceed for about 3 hours after which the reaction mixture was worked up by the following work-up procedure: the gel was transferred into a grinder in the presence of water for decomplexation of the polymer. The polymer was then filtered and washed three times by slurrying in water (ca. 25 g water per g polymer). The polymer was then allowed to stir in 0.15 wt. % aqueous hydrochloric acid for over 6 hr (ca. 25 g water per g of polymer). This slurry was boiled for several hours while allowing the methylene chloride to escape. The polymer was again filtered and washed three times (ca. 25 g water per g polymer), then boiled in a 0.15 wt % solution of aqueous ammonia (ca. 25 g solution per g polymer) for about 2 hours. The polymer was then filtered and washed three times (ca. 25 g water per g polymer).

After the above work up 200 g of wet powder was placed in a 2L Hastelloy B autoclave (Parr bomb) containing 900 mL of water. The autoclave was heated to the desired temperature (Table 1) and held for three hours. The polymer was then filtered and washed 3 times with water (ca. 25 g water per polymer). A control sample from the same batch (Table 1, run 1A) was boiled in water for 5 hours and washed 3 times with water as above. All samples were then dried for 16 hours at 200° C. Table 1 presents Sieglaff-McKelvey capillary rheometer melt viscosity data as well as levels of residual aluminum and chloride in the polymer after treatment. Improvements in quality can be seen for all hydrothermally treated samples. The treated samples showed a smaller change in melt viscosity after holding at 400° C. in the rheomter barrel, indicating better melt stability. All samples also showed lowered levels of residual chloride, and those treated at 275° C. or above also had lower measured levels of residual aluminum.

TABLE 1

| | | | | | Melt Viscosity at 400° C. | | |
|---|---|---|---|---|---|---|---|
| Run | Temp. (°C.) | Inh. Visc. | Al (ppm) | Cl (ppm) | at 5 min. | at 30 min. | at 60 min. |
| 1A | Control | 1.17 | 960 | 321 | 28,000 | 48,200 | 58,000 |
| 1B | 250 | 1.17 | 980 | 110 | 19,800 | 20,800 | 24,200 |
| 1C | 275 | 1.15 | 830 | 73 | 20,000 | 21,300 | 23,800 |
| 1D | 300 | 1.14 | 350 | 40 | 20,900 | 20,000 | 25,500 |
| 1E | 325 | 1.13 | — | 47 | 26,500 | 29,000 | 50,000 |

Another polymerization was conducted in the same manner as in Example 1, except that after work up the polymer was heated in an autoclave at 225° C. for 3 hours. The melt rheometer results are provided in Table 2.

TABLE 2

| | | | | Melt Viscosity at 400° C. | |
|---|---|---|---|---|---|
| Run | Treatment Conditions | Al (ppm) | Cl (ppm) | at 5 min. | at 30 min. |
| 2A | Control | — | — | 13,500 | 19,500 |
| 2B | Autoclave (225° C./3 hr) | — | — | 13,000 | 15,800 |

EXAMPLE 3

A reaction was performed as in Example 1, but the gel from the reaction (containing 21 g of polymer) was decomplexed by grinding twice in a Waring blendor containing 400 mL of dimethylformamide (DMF), with filtration in between. The polymer was then filtered and washed twice with 600 mL of DMF, stirred at 23° C. for 15 hours in 500 mL of DMF. This slurry was heated to 100° C. for 2.5 hours, filtered and washed twice with 600 mL of DMF, heated in 500 mL of DMF at 100° C. for 2 hours, filtered, boiled in 500 mL of water filtered and washed 3 times with 600 mL of water, and dried at 200° C. for 16 hours. One portion of the sample was given a 300° C./3 hour treatment as described in Example 1. Table 3 shows the improvement in melt viscosity retention as well as lowered levels of residual aluminum and chloride for the treated sample compared to the control.

TABLE 3

| | | | | | Melt Viscosity at 400° C. | |
|---|---|---|---|---|---|---|
| Run | Temp. (°C.) | Inh. Visc. | Al (ppm) | Cl (ppm) | at 5 min. | at 30 min. |
| 3A | Control | 1.06 | 396 | 62 | 11,300 | 18,450 |
| 3B | 300 | 1.04 | 99 | 33 | 11,800 | 15,700 |

EXAMPLE 4

A reaction was performed as in example 1, but the polymer was dried at 200° C. prior to autoclave treatment. To the autoclave was added 20g of polymer and 900 mL of an aqueous 0.092M sodium dihydrogen phosphate solution. The system was heated to 300° C. for 3 hours. Table 4 shows the lowering in initial melt viscosity and the improvement in melt viscosity retention for this sample as compared to the control. Also, the extrudate of run 4B was lighter in color than the extrudate of run 4B.

TABLE 4

| Run | Temp. (°C.) | Inh. Visc. | Al (ppm) | Cl (ppm) | Melt Viscosity at 400° C. at 5 min. | at 30 min. |
|---|---|---|---|---|---|---|
| 4A | Control | 1.05 | 1,041 | 351 | 11,200 | 15,000 |
| 4B | 300 | 1.01 | 919 | 36 | 6,000 | 7,000 |

EXAMPLE 5

A reaction was performed as in Example 1, but the powder was dried at 200° C. for 72 hours in an airflow oven prior to higher temperature treatment in an autoclave or airflow oven for the time and at the temperatures specified in Table 5 (runs 5B–5D). This experiment shows that improvements are also seen with oven heat treatments at elevated temperatures.

The second half of the table (runs 5E–5H) shows the effect of heat treatment on samples which were dried for at 200° C. for 30 days prior to treatment. The results indicate that simply drying for a longer time at a lower temperature (200° C./720 hours), that is, not according to our invention, does not give the same improvement. The strands of extrudate exiting the rheometer barrel were lighter in color for samples treated according to our invention, compared to the control samples.

TABLE 5

| Run | Treatment Conditions | Al (ppm) | Cl (ppm) | Melt Viscosity at 400° C. at 5 min. | at 30 min. |
|---|---|---|---|---|---|
| 5A | Control (a) | 880 | 180 | 23,700 | 32,400 |
| 5B | Oven (300° C./3 hr) | 920 | 117 | 23,800 | 27,500 |
| 5C | Oven (300° C./12 hr) | 960 | 90 | 23,300 | 26,000 |
| 5D | Autoclave (300° C./3 hr) | 130 | 37 | 17,000 | 23,700 |
| 5E | Control (b) | 890 | 126 | 23,500 | 31,300 |
| 5F | Oven (300° C./12 hr) | 990 | 82 | 25,000 | 27,300 |
| 5G | Autoclave (300° C./3 hr) | 433 | 31 | 19,000 | 24,700 |
| 5H | Oven (325° C./14 hr) | 980 | 109 | 31,000 | 32,800 |

(a) Control = dried at 200° C./72 hr only; samples 5B–5D dried at 200° C./72 hr plus oven or autoclave as shown
(b) Control = dried at 200° C./30 days only; samples 5F–5H dried at 200° C./30 days plus oven or autoclave as shown

EXAMPLE 6

A reaction was performed as in Example 1, except that after work up the wet powder was compacted (dewatered) before treatment in an oven (i.e., dry). The samples were evaluated with the melt rheometer at 420° C. rather than at 400° C. Table 6 shows the experimental results.

TABLE 6

| Run | Temp./Time (°C./hr) | Inh. Visc. | Al (ppm) | Cl (ppm) | Melt Viscosity at 420° C. at 5 min. | at 30 min. | at 40 min. |
|---|---|---|---|---|---|---|---|
| 6A | Cont. 1 | 1.14 | 1,389 | 99 | 16,500 | — | 29,500 |
| 6B | 300/17 | — | — | — | 12,800 | — | 18,500 |
| 6C | Cont. 2 | 1.10 | 1,548 | 117 | 12,800 | 20,500 | — |
| 6D | 300/12 | — | 1,522 | 65 | 12,000 | 14,100 | — |

EXAMPLE 7

A reaction was performed as in Example 1. Wet samples of polymer powder, after the work up, were heat treated for the times and temperatures indicated in Table 7. The last two entries (7H and 7I) represent heat treatments performed in a nitrogen oven. All other heat treatments were performed in an airflow oven. The data in Table 7 show the improvement in melt viscosity retention with heat treatment. The extrudate strands of samples treated according to our invention were lighter in color than the control sample.

TABLE 7

| Run | Temp./Time (°C./hr) | Inh. Visc. | Al (ppm) | Cl (ppm) | Melt Viscosity at 400° C. at 5 min. | at 30 min. |
|---|---|---|---|---|---|---|
| 7A | Control | 1.08 | 1,064 | 300 | 35,000 | 54,000 |
| 7B | 260/3 | — | — | — | 28,000 | 42,500 |
| 7C | 260/12 | — | 1,065 | 131 | 28,000 | 37,000 |
| 7D | 260/24 | — | — | — | 31,000 | 37,500 |
| 7E | 300/3 | — | — | — | 25,800 | 40,800 |
| 7F | 300/12 | — | 1,036 | 131 | 30,000 | 31,000 |
| 7G | 300/24 | — | — | — | 39,000 | 42,000 |
| 7H | 300/12 | — | — | — | 35,500 | 38,800 |
| 7I | 300/24 | — | — | — | 36,500 | 40,500 |

EXAMPLE 8

A polymerization was performed using p-phenoxybenzoyl chloride as the monomer, p-phenoxybenzophenone and benzoyl chloride as capping agents (0.45 and 0.43 wt. %, respectively, relative to p-phenoxybenzoyl chloride) 1,2-dichloroethane (EDC) as solvent, aluminum chloride as catalyst and lithium chloride as Lewis base. The p-phenoxybenzoyl chloride/lithium chloride/aluminum chloride molar ratio was 1/1.5/3 and the loading was 16 wt. % polymer solids. The reactants were mixed in a stirred vessel with the monomer and capping agents added together as the last components at below −15° C. The temperature was maintained for one hour during which the slurry of reactants became homogeneous. The reaction was then allowed to warm to 0° C. and after 2.3 hrs the viscosity had increased to the point that stirring was no longer possible and the reaction mixture was a gel. The reaction was kept at 0° C. for a total of 23 hrs after which the polymer was worked up in the same manner as described in Example 1 (except that in the decomplexation step a 0.15% aqueous hydrochloric acid solution was used). After the workup the powder was dried at 200° C. prior to a heat treatment at 300° C. for 14 hrs. Table 8 presents melt rheometer, aluminum and chloride residue and inherent viscosity data. Improvements were seen in the melt viscosity retention and the chloride catalyst residue level. The extrudate strands of samples treated according to our invention were lighter in color than strands of the control sample.

TABLE 8

| Run | Temp./Time (°C./hr) | Inh. Visc. | Al (ppm) | Cl (ppm) | Melt Viscosity at 400° C. at 5 min. | Melt Viscosity at 400° C. at 30 min. |
|---|---|---|---|---|---|---|
| 8A | Control | 0.99 | 483 | 104 | 14,800 | 20,500 |
| 8B | 300/14 | 0.99 | 489 | 42 | 17,000 | 19,000 |

EXAMPLE 9

This example compares the effect of different work-up conditions. A polymerization was performed as in Example 1. A sample of polymer was taken right after the hydrochloric acid stirring step (before the stripping step) and was given the 300° C. heat treatment. The data from this sample and from a control sample are included in Table 9 (Entries 9A and 9B). Table 9 also has data for polymer from the same reaction which was given the complete work up procedure described in Example 1 prior to heat treatment.

TABLE 9

| Run | Work-up Conditions | Melt Viscosity at 400° C. at 5 min. | Melt Viscosity at 400° C. at 30 min. |
|---|---|---|---|
| 9A | Digest only, 200° C. dry | 28,000 | 36,400 |
| 9B | Digest only, 300° C./16 hr dry | 29,000 | 32,900 |
| 9C | Full workup, 200° C. dry | 25,800 | 30,900 |
| 9D | Full workup, 300° C./12 hr dry | 26,100 | 29,700 |

EXAMPLE 10

Three batches were produced as in Example 1. After decomplexation the polymer was simply slurried 4 times in water for 15 min each (3 g polymer/100 g water) with filtrations between slurries. A sample was then heat treated in an airflow oven for 12 hours at 300° C.. The data in Table 10 show the improvement in melt viscosity retention for the heat treated sample

TABLE 10

| Run | Treatment Conditions | Al (ppm) | Cl (ppm) | Melt Viscosity at 400° C. at 5 min. | Melt Viscosity at 400° C. at 30 min. |
|---|---|---|---|---|---|
| 10A | Control (Batch 1) | 1097 | 292 | 17,150 | 23,750 |
| 10B | 300° C./12 hr | 1086 | 179 | 13,300 | 13,800 |
| 10C | Control (Batch 2) | 1176 | 321 | 13,500 | 14,300 |
| 10D | 300° C./12 | 1087 | 199 | 13,300 | 13,500 |
| 10E | Control (Batch 3) | 1055 | 212 | 11,500 | 22,500 |
| 10F | 300° C./12 hr | 1085 | 175 | 10,400 | 10,750 |

We claim:

1. A method of stabilizing a poly(arylene ether ketone), comprising heating the poly(arylene ether ketone) at a temperature between about 240° C. and about 325° C. for a period of between about 0.5 and about 24 hours, prior to any melt-processing of the poly(arylene ether ketone).

2. A method according to claim 1, wherein the heating is performed in an air or nitrogen atmosphere.

3. A method according to claim 1, wherein the heating is performed under a vacuum.

4. A method according to claim 1, wherein the heating is performed at a temperature between about 275° and about 310° C. for a period of between about 2 and about 17 hr.

5. A method of stabilizing a poly(arylene ether ketone), comprising hydrothermally treating the poly(arylene ether ketone) by heating it to a temperature of at least 160° C. while contacting it with water.

6. A method according to claim 5, wherein the hydrothermal treatment is performed at a temperature between about 240° and about 300° C. for a period of between about 0.25 and about 5 hr.

7. A method according to claim 5, wherein the hydrothermal treatment is performed in a pressurized vessel in which the poly(arylene ether ketone) is at least partially immersed in an aqueous medium.

8. A method according to claim 7, wherein the aqueous medium consists essentially of water.

9. A method according to claim 5, wherein the hydrothermal treatment is performed by contacting the poly(arylene ether ketone) with superheated steam.

10. A method according to claim 1 or 5 wherein the poly(arylene ether ketone) has a repeat unit selected from the group consisting of

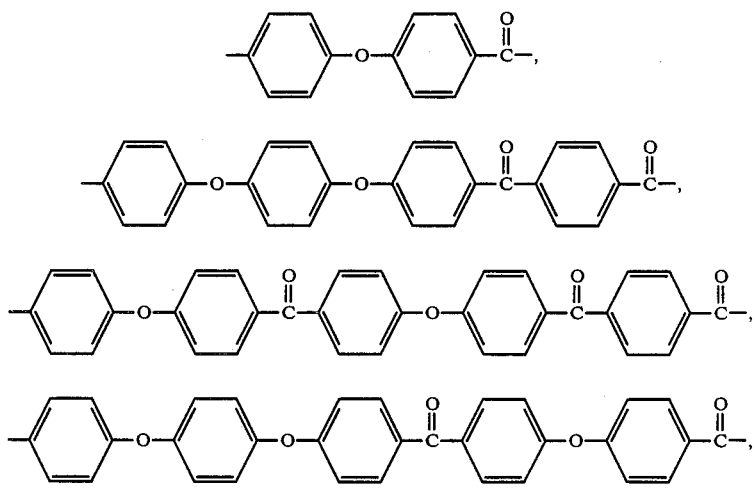

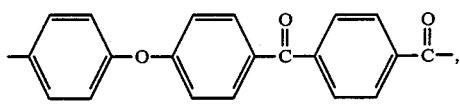
and
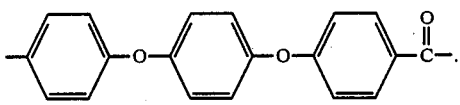
11. A method according to claim 1 or 5 wherein the poly(arylene ether ketone) has been made by a Friedel-Crafts polymerization with a Lewis acid catalyst.
12. A method according to claim 11, wherein the Lewis acid catalyst is aluminum chloride.
* * * * *